(12) United States Patent
Viegas et al.

(10) Patent No.: US 8,534,084 B2
(45) Date of Patent: *Sep. 17, 2013

(54) HVAC MANAGEMENT SYSTEM FOR A VEHICLE

(75) Inventors: Herman H. Viegas, Bloomington, MN (US); William F. Mohs, Minneapolis, MN (US)

(73) Assignee: Thermo King Corporation, Minneapolis, MN (US)

( * ) Notice: Subject to any disclaimer, the term of this patent is extended or adjusted under 35 U.S.C. 154(b) by 110 days.

This patent is subject to a terminal disclaimer.

(21) Appl. No.: 13/242,923

(22) Filed: Sep. 23, 2011

(65) Prior Publication Data

US 2012/0011870 A1    Jan. 19, 2012

Related U.S. Application Data

(63) Continuation of application No. 12/117,912, filed on May 9, 2008, now Pat. No. 8,051,670.

(51) Int. Cl.
*F25B 27/00*     (2006.01)
(52) U.S. Cl.
USPC ................................ 62/236; 62/476
(58) Field of Classification Search
USPC .............. 62/236, 244, 239, 476, 480, 238.76, 62/238.7; 165/43, 44
See application file for complete search history.

(56) References Cited

U.S. PATENT DOCUMENTS

| | | | |
|---|---|---|---|
| 3,828,566 A | 8/1974 | Wetzel | |
| 4,180,126 A | 12/1979 | Rush et al. | |
| 4,205,529 A | 6/1980 | Ko | |
| 4,280,330 A | 7/1981 | Harris et al. | |
| 4,430,864 A | 2/1984 | Mathiprakasam | |
| 4,652,278 A | 3/1987 | Oliker | |
| 4,883,226 A | 11/1989 | Tomita et al. | |
| 4,930,322 A | 6/1990 | Ashley et al. | |
| 4,936,505 A | 6/1990 | Hall | |
| 5,042,266 A | 8/1991 | Yamashita et al. | |
| 5,277,038 A * | 1/1994 | Carr | ................................ 62/434 |
| 5,386,823 A | 2/1995 | Chen | |
| 5,448,895 A | 9/1995 | Coellner et al. | |
| 5,667,560 A | 9/1997 | Dunne | |

(Continued)

FOREIGN PATENT DOCUMENTS

| | | |
|---|---|---|
| JP | 5221233 | 8/1993 |
| JP | 8099522 | 4/1996 |

(Continued)

*Primary Examiner* — Mohammad M Ali

(74) *Attorney, Agent, or Firm* — Michael Best & Friedrich LLP

(57) ABSTRACT

A vehicle that includes a frame, a prime mover, an alternator, a cabin, a HVAC system, and a power source. The prime mover is operable in a first mode that is configured for driving the vehicle and a second mode that is configured for standby operation of the vehicle. The cabin includes walls that define a space and that have insulation to insulate the space. The HVAC system is in communication with the cabin to condition the space, and includes a cooling system, a heating system, and a sorption system that dehumidifies air provided to the space. The power source has a battery that is in electrical communication with the alternator and the HVAC system to supply power to the HVAC system from the battery when the prime mover is in the first mode and when the prime mover is in the second mode.

11 Claims, 2 Drawing Sheets

(56) References Cited

U.S. PATENT DOCUMENTS

| | | |
|---|---|---|
| 5,718,122 A | 2/1998 | Maeda |
| 5,896,750 A | 4/1999 | Karl |
| 5,899,081 A | 5/1999 | Evans et al. |
| 5,901,572 A | 5/1999 | Peiffer et al. |
| 6,038,879 A | 3/2000 | Turcotte et al. |
| 6,272,873 B1 | 8/2001 | Bass |
| 6,276,166 B1 * | 8/2001 | Sarkisian et al. ............... 62/480 |
| 6,282,919 B1 | 9/2001 | Rockenfeller et al. |
| 6,415,625 B1 | 7/2002 | Rockenfeller et al. |
| 6,708,512 B2 | 3/2004 | Kitamura et al. |
| 6,886,350 B2 | 5/2005 | Petesch et al. |
| 7,032,393 B2 | 4/2006 | Tamai et al. |
| 7,043,934 B2 * | 5/2006 | Radermacher et al. ......... 62/285 |
| 7,047,751 B2 | 5/2006 | Dinnage et al. |
| 7,061,208 B2 | 6/2006 | Nishihata et al. |
| 7,143,589 B2 | 12/2006 | Smith et al. |
| 7,363,766 B2 * | 4/2008 | Eisenhour .................... 62/3.61 |
| 7,410,533 B2 * | 8/2008 | Yabu .............................. 96/127 |
| 7,412,836 B2 * | 8/2008 | Ikegami et al. ................... 62/94 |
| 7,428,821 B2 * | 9/2008 | Kashirajima et al. ........... 62/271 |
| 7,765,824 B2 * | 8/2010 | Wong et al. .................... 62/239 |
| 7,810,339 B2 * | 10/2010 | Ishida et al. .................... 62/160 |
| 2002/0002833 A1 | 1/2002 | Klapp et al. |
| 2005/0050906 A1 | 3/2005 | Dinnage et al. |
| 2005/0161211 A1 | 7/2005 | Zeigler et al. |
| 2005/0193754 A1 | 9/2005 | Chang et al. |
| 2005/0268633 A1 | 12/2005 | Smith et al. |
| 2005/0268635 A1 | 12/2005 | Moffitt |
| 2006/0201183 A1 | 9/2006 | Otake et al. |
| 2007/0028639 A1 | 2/2007 | Ikegami et al. |

FOREIGN PATENT DOCUMENTS

| | | |
|---|---|---|
| JP | 2000337657 | 12/2000 |
| JP | 2003139425 | 5/2003 |
| JP | 2007170786 | 7/2007 |
| KR | 20060118583 | 11/2006 |

* cited by examiner

HVAC MANAGEMENT SYSTEM FOR A VEHICLE

RELATED APPLICATIONS

This patent application claims priority to U.S. patent application Ser. No. 12/117,912, filed May 9, 2008, the entire contents of which are hereby incorporated by reference.

BACKGROUND

The present invention relates to a heating, ventilation, and air conditioning ("HVAC") system for a vehicle. More particularly, the present invention relates to a vehicle that includes an insulated cabin and a HVAC system that conditions the cabin.

Large tractors or trucks (e.g., semi-tractors) are commonly used to transport cargo within a trailer or container. Existing tractors in a tractor-trailer combination typically include a cabin that is conditioned by multiple mechanically driven vapor compression air conditioning systems. In most tractors, the cabin is poorly insulated, and as a result, the multiple air conditioning systems cycle on and off very frequently. The frequent cycling of the air conditioning systems provides inefficient and expensive conditioning of the air in the cabin. The air conditioning systems and other components of the tractor and/or trailer are typically powered by a primary engine of the tractor when the vehicle is operating or moving. Some tractors include an auxiliary power unit that has a secondary engine that supplies power to the air conditioning systems and other components of the tractor when the primary engine is in a standby mode (i.e., when the primary engine is off).

SUMMARY

In one embodiment, the invention provides a vehicle that includes a frame, a prime mover coupled to the frame, an alternator coupled to the prime mover, and a cabin supported on the frame. The prime mover is operable in a first mode that is configured for driving the vehicle, and a second mode that is configured for standby operation of the vehicle. The cabin includes walls that define a space and that have insulation that insulates the space. The vehicle also includes a HVAC system that is coupled to the frame and that is in communication with the cabin to condition the space. The HVAC system includes a cooling system that is configured to cool the space, a heating system that is configured to heat the space, and a sorption system that is configured to dehumidify air provided to the space. The vehicle further includes a power source that has a battery in electrical communication with the alternator. The battery is further in electrical communication with the HVAC system to supply power to the HVAC system from the battery when the prime mover is in the first mode and when the prime mover is in the second mode.

In another embodiment, the invention provides a method of operating a vehicle that includes a prime mover that is operable in a first mode configured for driving the vehicle, and that is operable in a second mode configured for standby operation of the vehicle. The method includes providing a cabin that has walls defining a space, insulating the cabin, and a HVAC system in the vehicle. The HVAC system includes a cooling system that has an evaporator assembly having a cooling coil, a heating system that has a heating coil, and a sorption system that has a desiccant. The method also includes powering the HVAC system using a battery when the vehicle is in the first mode and when the vehicle is in the second mode, circulating a refrigerant through the evaporator assembly, circulating a coolant through the heating coil, selectively directing an airflow through one of the sorption system and a bypass. The sorption system adsorbs moisture from the airflow using the desiccant such that the airflow is substantially dehumidified by the sorption system. The bypass directs the airflow around the sorption system without directing the airflow through the sorption system. The method further includes directing the airflow from one of the sorption system and the bypass toward at least one of the evaporator assembly and the heater coil, conditioning the airflow via heat exchange relationship with one of the refrigerant flowing through the evaporator assembly and the coolant flowing through the heater coil, and conditioning the space using the conditioned airflow.

In yet another embodiment, the invention provides a vehicle that includes a frame, a prime mover coupled to the frame, and a cabin. The cabin is supported on the frame and includes walls that define a space, and that have insulation defined by at least one of a vacuum insulation panel and an aerogel. The vehicle also includes a sorption system, a bypass, and at least one housing. The sorption system includes an inlet, an outlet, and a desiccant. The inlet directs an airflow over the desiccant, and the desiccant adsorbs moisture from the airflow to substantially dehumidify the airflow. The bypass directs the airflow around the sorption system without directing the airflow through the sorption system such that the airflow via the bypass is a non-dehumidified airflow. The at least one housing is in communication with the space and includes a portion of a cooling system that has a cooling coil that is in communication with the sorption system to receive the airflow via the outlet. The housing also includes a portion of a heating system that has a heating coil that is in communication with the bypass to receive the airflow via the bypass. The airflow from one of the sorption system and the bypass is conditioned by one of the cooling coil and the heating coil prior to discharge of the airflow into the space.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
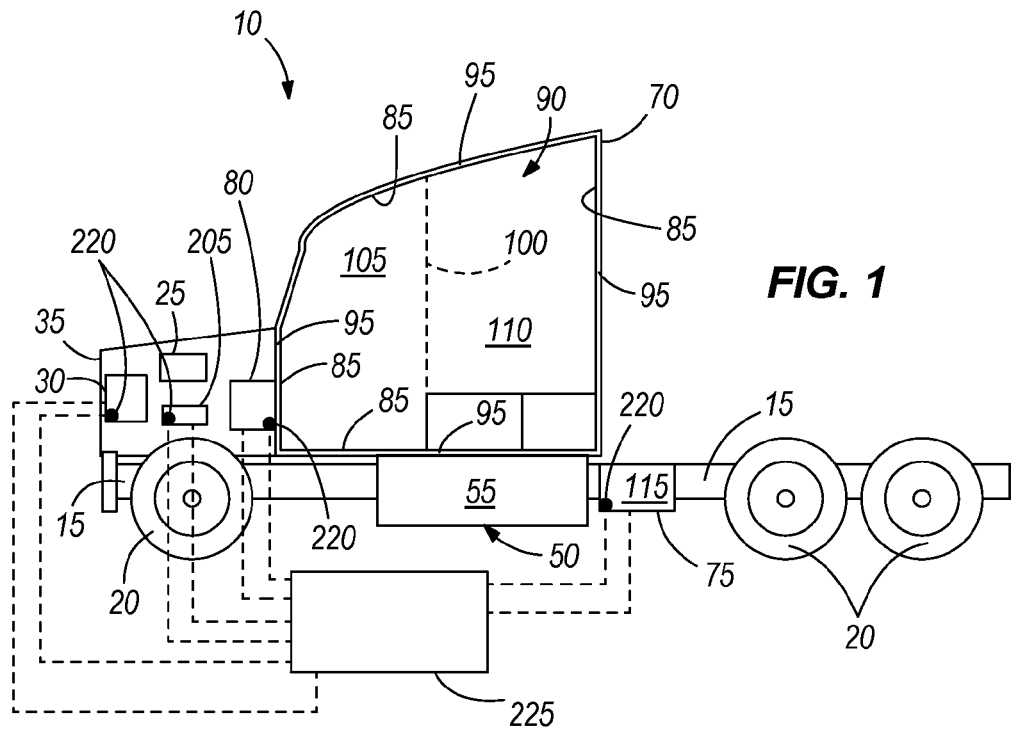
FIG. 1 is a schematic of a vehicle that includes a cabin, a power source, and a HVAC.

FIG. 1 shows an exemplary vehicle 10 according to an embodiment of the invention. The vehicle 10 is a semi-tractor or other similar vehicle (e.g., straight truck, van, etc.) that is used to transport cargo stored in a cargo compartment (e.g., a container, a trailer, etc.) to one or more destinations. Hereinafter, the term "vehicle" shall be used to represent all such tractors and trucks, and shall not be construed to limit the invention's application solely to a tractor in a tractor-trailer combination.

The vehicle 10 includes a frame 15, wheels 20, an alternator or direct current ("DC") generator 25, and a prime mover 30. The wheels 20 are rotatably coupled to the frame 15 to permit movement of the vehicle 10. The alternator 25 is coupled to the prime mover 30 so that mechanical energy produced by the prime mover 30 can be converted into electrical energy, or electricity.

The prime mover 30 is coupled to the frame 15 and is disposed in a compartment 35 that is located adjacent a forward end of the vehicle 10. The prime mover 30 is operable in a first mode and a second mode, and includes an "On" state and an "Off" state. The first mode corresponds to the prime mover 30 being engaged so that the vehicle 10 can be driven. The first mode further corresponds to when the prime mover 30 is idling (e.g., when the prime mover 30 is in the "On" state), but is not engaged so that the operator can drive the vehicle 10). In other words, the prime mover 30 is operable in the first mode when the prime mover 30 is in the "On" state.

The prime mover 30 is in the second mode during standby operation of the vehicle 10 (e.g., when the vehicle 10 is parked, etc.). Generally, standby operation of the vehicle 10 corresponds to the prime mover 30 being disengaged. In other words, the prime mover 30 is operating in the second mode when the prime mover 30 in the "Off" state.

The prime mover 30 is in communication with one or more of the wheels 20 to power the wheels 20 when the vehicle 10 is in the first mode. The prime mover 30 can be an internal combustion engine (e.g., a diesel engine, etc.), or alternatively, a hybrid engine that includes an electrical power system coupled to the internal combustion engine. In other embodiments, the prime mover 30 can be a fully electrical power system without a corresponding internal combustion engine. Hereinafter, the term "prime mover" shall be used to represent all such propulsion systems, and shall not be construed to limit the scope of the invention solely to internal combustion engines.

Figure 2:
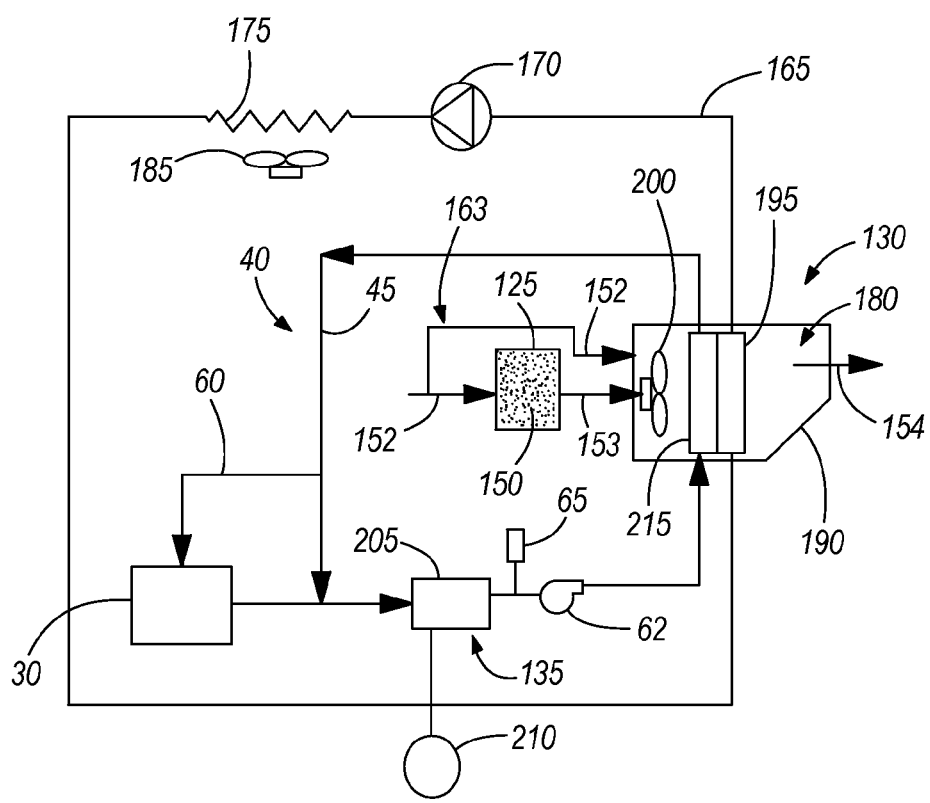
FIG. 2 is a schematic of the HVAC system of FIG. 1 including a cooling system, a heating system, and a sorption system.

FIGS. 1 and 2 show that the vehicle 10 also includes a coolant system 40 that has a coolant circuit 45, and a fuel system 50 that has a fuel reservoir 55. The prime mover 30 is in fluid communication with the coolant circuit 45 via a fluid line 60 to maintain the prime mover 30 at an operable temperature when the prime mover 30 is in the "On" state, and to selectively heat the prime mover 30 when the prime mover is in the "Off" state (e.g., approximately one hour before the prime mover 30 is started, etc.). The coolant system 40 includes a pump 62 that is disposed in the coolant circuit 45 to circulate a coolant through the coolant circuit 45, and an expansion tank 65 that can receive some of the coolant when the coolant circuit 45 is operating at relatively high temperatures. In some constructions, the coolant system 40 may also include other components (e.g., flow control valves, etc.).

The fuel reservoir 55 is in fluid communication with the prime mover 30 to deliver fuel to the prime mover 30 when the prime mover 30 is in the "On" state. As shown in FIG. 1, the fuel reservoir 55 is attached to the frame 15, although the fuel reservoir 55 may be attached to the vehicle 10 in other locations.

FIG. 1 shows that the vehicle 10 further includes a cabin 70, a power source 75, and a heating, ventilation, and air conditioning ("HVAC") system 80. The cabin 70 is supported on the frame 15 rearward of the compartment 35, and includes walls 85 that define a space 90. The walls 85 include insulation 95 that insulates the space 90. In some embodiments, the insulation 95 includes one or more vacuum insulation panels that have a core material (e.g., mineral powder, mineral fiber, fiberglass, silica, open-cell foam, carbon/silica aerogels, open-cell polyurethane foam, polystyrene foam, etc.) that is enclosed by membrane film (e.g., glass, metal, plastic, etc.) in an air-tight envelope or casing. In other embodiments, the insulation 95 can include an aerogel. In still other embodiments, other types of insulation (e.g., fiberglass, silica, open-cell foam, etc.) can be used to insulate the space 90.

FIG. 1 shows that the space 90 is divided by a partition 100 into a driving portion 105 and a sleeping portion 110. In other embodiments, the space 90 may be a single space without the partition 100.

Figure 4:
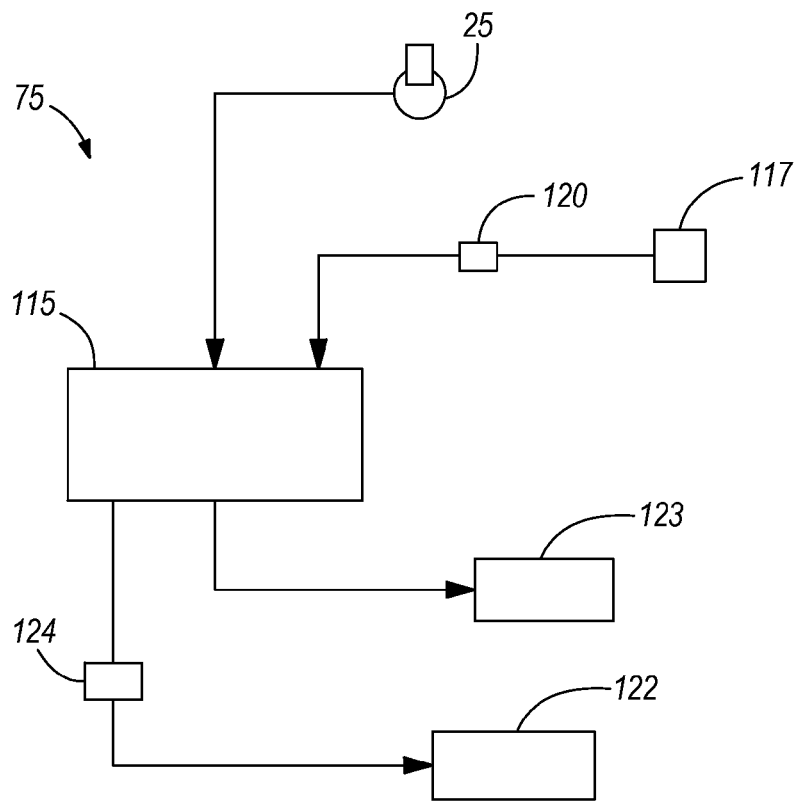
FIG. 4 is a schematic of the power source of FIG. 1.

FIG. 4 shows that the power source 75 includes a battery pack 115 that is in electrical communication with the alternator 25 to receive electrical energy. The battery pack 115 also can be selectively in electrical communication with a stationary electric stand 117 to receive converted electrical energy from an alternating current ("AC") power source via a DC converter 120. Alternatively, the battery pack 115 can be in electrical communication with a direct current source.

The battery pack 115 is a direct current ("DC") power source that is in electrical communication with the HVAC system 80 to supply power to the HVAC system 80, and is further in electrical communication with alternating current accessories 122 and direct current accessories 123 of the vehicle 10 to supply electrical power to the accessories 122, 123. For example, the battery pack 115 can supply AC electrical energy to the accessories 122 via an inverter 124. The battery pack 115 also can supply DC electrical energy directly to the accessories 123. In some embodiments, the battery pack 115 includes a plurality of batteries that form a battery assembly. In other embodiments, the battery pack 115 may include a single battery.

With reference to FIG. 1, the HVAC system 80 is coupled to the vehicle 10 and is in communication with the cabin 70 to condition the space 90. The vehicle 10 illustrated in FIG. 1 includes a single HVAC system 80 that is located adjacent and in communication with the space 90. In other constructions, one HVAC system 80 can be positioned in the vehicle 10 to condition the driving portion 105, and another HVAC system 80 can be positioned in the vehicle 10 to condition the sleeping portion 110. Generally, the quantity of HVAC systems 80 in the vehicle 10 depends at least in part on the size of the cabin 70, and the number of zones to be conditioned within the cabin 70.

FIG. 2 shows that the HVAC system 80 includes a sorption system 125, a cooling system 130, and a heating system 135. In some constructions, the HVAC system 80 may also include a defrost system (not shown). Generally, the components of the HVAC system 80 can be located anywhere on the vehicle 10. In some constructions, the components of the HVAC system 80 can be in a single, unitary package. In other constructions, each component of the HVAC system 80 can be separate from the other components of the HVAC system 80.

Figure 3:
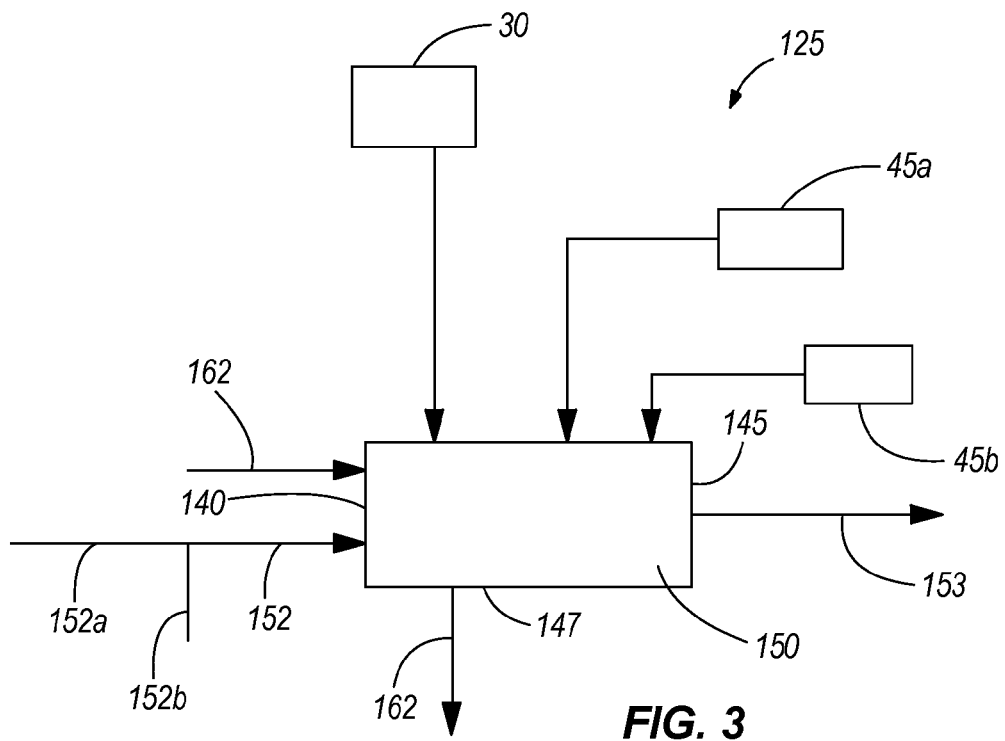
FIG. 3 is a schematic of a portion of the sorption system of FIG. 2.

FIGS. 2 and 3 show that the sorption system 125 includes an inlet 140, a first outlet 145, a second outlet 147, and a desiccant 150 that is disposed between the inlet 140 and the outlets 145, 147. As illustrated in FIG. 3, an airflow 152 through the sorption system 125 is formed from air 152a that is received via the cabin 70 (e.g., recycled air), and air 152b that is received from the atmosphere (e.g., make-up fresh air) outside the vehicle 10. The sorption system 125 is in communication with the cabin 70 and with the atmosphere via ducting (not shown) so that air from the cabin 70 and/or from the atmosphere can be directed through the sorption system 125. In other embodiments, the sorption system 125 can receive air from one of the cabin 70 or the atmosphere.

The desiccant 150 is operable to adsorb moisture from the airflow 152 so that a substantially dehumidified airflow 153 is discharged through the first outlet 145. Generally, the sorption system 125 is in communication with a heat source so that moisture adsorbed from the airflow 152 by the desiccant 150 can be desorbed from the desiccant 150 and vented into the atmosphere via the second outlet 147. The sorption system 125 is also in communication with a cooling source (e.g., ambient air) so that the desorbed or regenerated desiccant 150 can be cooled prior to the desiccant 150 continuing to adsorb moisture from the airflow 152. In some embodiments, the sorption system 125 can be divided into a first portion and a second portion so that the desiccant 150 in one of the first portion and the second portion can adsorb moisture from the airflow entering the inlet 140, while the desiccant 150 of the other of the first portion and the second portion can be desorbed via the heat source and cooled via the cooling source.

For example, FIG. 3 shows that the sorption system 125 is in communication with the prime mover 30 so that heat generated by the prime mover 30 can be directed through the sorption system 125 and over the desiccant 150 to desorb moisture from the desiccant. As shown in FIG. 3, the sorption system 125 is also in heat exchange relationship with a relatively warm portion 45a of the coolant that flows through the coolant circuit 45 so that heat from the coolant can desorb moisture from the desiccant 150. Generally, a fan or other air moving device (not shown) can be positioned adjacent the sorption system 125 to direct a purge airflow 162 through the sorption system 125 to regenerate the desiccant 150. The purge airflow 162 can be formed from air returning from the cabin 70 and/or from other sources.

The relatively warm portion 45a of the coolant flows in heat exchange relationship with the desiccant 150 to heat the desiccant 150 to desorb moisture from the desiccant 150. In other constructions, the sorption system 125 can be in communication or heat exchange relationship with one of the prime mover 30 and the coolant circuit 45. In still other constructions, the sorption system 125 may be in communication or heat exchange relationship with other heat sources. Moisture from the desiccant 150 is carried by the purge airflow 162 out of the sorption system 125. The moisture-laden purge airflow 162 may be heated indirectly by the prime mover 30 and/or via heat exchange with the relatively warm portion 45a of the coolant.

The desiccant 150 can be cooled via the cooling source after the desiccant is desorbed, and then reused to adsorb moisture from the airflow 152. As shown in FIG. 3, the sorption system 125 is in heat exchange relationship with a relatively cool portion 45b of the coolant circuit 45 to provide cooling for the desiccant 150 after the desiccant 150 has been desorbed. In some constructions, the sorption system 125 can be in heat exchange relationship with ambient air adjacent the vehicle 10 to provide cooling for the desiccant 150. In other constructions, the sorption system 125 may be in communication with other cooling sources (e.g., a second coolant circuit, air from the cabin 70, etc.).

FIG. 2 shows that the HVAC system 80 also includes a bypass 163 that is disposed adjacent the sorption system 125. The bypass 163 selectively directs the airflow 152 around the sorption system 125 without directing the airflow 152 through the sorption system 125 so that the airflow 152 is non-dehumidified prior to conditioning of the airflow 152 by the cooling system 130 and the heating system 135. The non-dehumidified airflow 152 via the bypass 163 is formed from the air 152a that is received via the cabin 70 (e.g., recycled air), and/or the air 152b that is received from the atmosphere (e.g., make-up fresh air) outside the vehicle 10. In some constructions, one or more flow control devices (e.g., check valves, etc.) can be located adjacent the inlet 140 and located in the bypass 163 to inhibit flow of the airflow 152 into one or both of the sorption system 125 and the bypass 163. Generally, the flow control devices adjacent the inlet 140 and in the bypass 163 regulate the airflow 152 within the HVAC system 80 so that the airflow 152 can be directed through one of the sorption system 125 and the bypass 163 during operation of the HVAC system 80. In some constructions, the flow control devices can be partially open so that a portion of the airflow 152 can flow through the inlet 140, and a portion of the airflow 152 can flow through the bypass 163.

FIG. 2 shows that the cooling system 130 includes a refrigerant circuit 165 that has a compressor assembly 170, a condenser or gas cooler 175, a heat exchanger or evaporator assembly 180, and a refrigerant that flows through the compressor assembly 170, the condenser 175, and the evaporator assembly 180. In other constructions, the refrigerant circuit 165 may also include other components (e.g., flow control valves, expansion valves, etc.).

The compressor 170 and the condenser 175 can be located anywhere on the vehicle 10. In some constructions, the condenser 175 can mounted to an exterior surface of one of the walls 85. A fan 185 is positioned adjacent the condenser 175 to assist with transferring heat from the refrigerant in the condenser 175 to the atmosphere by directing air over the condenser 175.

The evaporator assembly 180 is located adjacent and in communication with the sorption system 125 and the bypass 163 to selectively receive the dehumidified airflow 153 exiting the sorption system 125 through the outlet 145, and the non-dehumidified airflow 152 from the bypass 163. In some constructions, the evaporator assembly 180 is attached to the vehicle 10 adjacent a rear of the cabin 70. In other constructions, the evaporator assembly 180 can be positioned in the compartment 35 adjacent the driving portion 105. In still other constructions, the evaporator assembly 180 may take a compact design and be installed in the sleeping portion 110, or another convenient location.

As shown in FIG. 2, the evaporator assembly 180 includes a housing 190, an evaporator or cooling coil 195 that is disposed in the housing 190, and a fan 200 that is disposed in the housing 190 and that is in communication with the cooling coil 195. The sorption system 125, the bypass 163, and the evaporator assembly 180 are substantially aligned so that the fan 200 can generate the airflow 152 through the sorption system 125, through the bypass 163, and over the cooling coil 195. In other constructions, the airflow 152 into the sorption system 125 and/or through the bypass 163 can be generated by other air moving devices (not shown).

With continued reference to FIG. 2, the heating system 135 includes a heater 205 that is in communication with the coolant circuit 45, and a fuel reservoir 210. In some constructions, the fuel reservoir 210 can be the same as the fuel reservoir 55 of the vehicle 10. The heater 205 is a direct-fired diesel heater that is positioned adjacent the coolant circuit 45 and that includes heating elements (e.g., glow pin, heat exchanger, etc.) that heat the coolant in the coolant circuit 45. In one construction, the heater 205 is an Espar hydronic heater. In other constructions, the heater 205 can be any heater that can satisfy the heating requirements of the application.

The heating system 135 also includes a heating coil 215 that is in fluid communication with the coolant circuit 45. As illustrated in FIG. 2, the heating coil 215 is disposed in the housing 190, and is in communication with the sorption system 125 and the bypass 163 to receive one of the airflows 152, 153 and to heat the respective airflow 152, 153. The airflows 152, 153 can be heated by the heat source that is used to desorb the desiccant 150, or alternatively, by another heat source. In some constructions, the heating coil 215 can be located elsewhere in the vehicle 10. The cooling coil 195 and the heating coil 215 are separated from each other so that the coolant circuit 45 and the refrigerant circuit 165 are not mixed.

During operation of the heating system 135 it may not be necessary for air that is directed over the heating coil 215 to be dehumidified by the sorption system 125. For example, the airflow 152 can bypass the sorption system 125 via the bypass 163 prior to heating the airflow 152 via heat exchange with the heated coolant in the heating coil 215. Alternatively, the airflow 152 can be dehumidified by the sorption system 125, and the dehumidified airflow 153 can then be directed into the housing 190 to be heated by the heating coil 215. The heated airflow 154 is then discharged into the space 90.

The vehicle 10 also includes a plurality of sensors 220 and a controller 225. The sensors 220 are in communication with various sub-systems of the vehicle 10, and are further in electrical communication with the controller 225. As illustrated in FIG. 1, the sensors 220 are in communication with the prime mover 30, the HVAC system 80, and the battery pack 115 to sense various parameters associated with the respective sub-systems. The sensors 220 are operable to generate signals indicative of the parameters that are being sensed, and are further operable to deliver the signals to the controller 225. In other constructions, the sensors 220 may also be in communication with other components and/or sub-systems of the vehicle 10, and/or in communication with the space 90.

The controller 225 is disposed in the vehicle 10, and is in electrical communication with the sensors 220 to receive the signals from the sensors 220 and to monitor the parameters of the vehicle 10. The controller 225 is also in communication with the various sub-systems of the vehicle 10 to control operation of the sub-systems in response to the signals from the sensors 220. For example, the controller 225 can be in communication with the prime mover 30, the coolant system 40, the HVAC system 80, the battery pack 115, and the heater 205 to control operation of these sub-systems. In other constructions, the controller 225 may be in communication with other sub-systems. In some constructions, the controller 225 can be a stand-alone controller. Alternatively, the controller 225 can be a part of or subsumed in other controllers of the vehicle 10.

In operation, the battery pack 115 is the main source of electrical power for the vehicle 10. The battery pack 115 supplies power to the HVAC system 80, the vehicle accessories, and other components of the vehicle 10 when the prime mover 30 is in the first mode and when the prime mover 30 is in the second mode. When the prime mover 30 is in the first mode, the alternator 25 converts mechanical energy of the prime mover 30 into electrical energy. The battery pack 115 is charged by the alternator 25 whenever the prime mover 30 is in the first mode. When the prime mover 30 is in the second mode, the battery pack 115 is no longer charged by the alternator 25. Instead, the battery pack 115 can be charged by external power sources (e.g., the electric stand 117, etc.) when the prime mover 30 is in the second mode. When the prime mover 30 is in the second mode and the battery pack 115 cannot be charged by external power sources (e.g., the battery pack 115 is not in electrical communication with the electric stand 117, etc.), the prime mover 30 can be automatically started by the controller 225 in response to the power of the battery pack 115 being at or below a predetermined power level.

The walls 85 of the cabin 70 are insulated using the vacuum insulation panels and/or the aerogel to provide a super-insulated space 90. The insulation 95 allows the conditions of the space 90 to be effectively maintained using the HVAC system 80, and inhibits substantial heat transmission (i.e., heat gain, heat loss) through the walls 85.

Generally, the coolant in the coolant circuit 45 is heated by the prime mover 30 when the prime mover 30 is in the first mode. The heater 205 is disengaged or off when the prime mover 30 is in the first mode. Alternatively, the heater 205 can be engaged or turned on to selectively provide additional heating of the coolant when the prime mover 30 is in the first mode. When the prime mover 30 is in the second mode, the heat supplied by the heater 205 selectively heats the coolant, which can be selectively used to warm the prime mover 30 so that the prime mover 30 can more easily be started in relatively cold ambient conditions.

The HVAC system 80 selectively conditions the space 90 using the sorption system 125, the cooling system 130, and the heating system 135. When the space 90 is cooled, the fan 200 draws the airflow 152 through the inlet 140, over the desiccant 150, and through the outlet 145. The airflow 152 is substantially dehumidified via adsorption of moisture by the desiccant 150 as is known in the art. The dehumidified airflow 153 is then directed through the evaporator assembly 180, where the airflow 153 is conditioned so that the conditioned airflow 154 can be discharged into the space 90. In some constructions, at least a portion of the airflow 152 can be directed through the bypass 163 during operation of the cooling system 130 to bypass the sorption system 125 (e.g., when previously conditioned air from the cabin 70 is recirculated through the HVAC system 80).

Eventually, the desiccant 150 that has been adsorbing moisture from the airflow 152 becomes saturated and can no longer dehumidify the airflow 152. Once the desiccant 150 is saturated, a regeneration process of the sorption system 125 is begun to desorb the moisture from the desiccant 150. During the regeneration process, the HVAC system 80 conditions the space 90 with the non-dehumidified airflow 152 via the bypass 163. The flow control devices redirect the airflow 152 through the bypass 163 toward the evaporator assembly 180, and inhibit or prevent the airflow 152 from entering the sorption system 125. In some constructions, one or more of the components of the HVAC system 80 can be shutdown during the regeneration process.

For example, during operation of the sorption system 125, moisture in the airflow 152 is adsorbed by the desiccant 150 for approximately ninety percent of the operation time. In this example, regeneration (e.g., desorption and cooling) of the desiccant 150 lasts for approximately ten percent of the operation time. The time duration for adsorption by and regeneration of the desiccant 150 can be different from the time frames discussed herein. During the regeneration process, the HVAC system 80 may operate under a relatively large load due to the non-dehumidified nature of the airflow 152 from the bypass 163. However, the duration of the regeneration process is relatively short and does not substantially affect the efficiency of the HVAC system 80. Furthermore, air from the cabin 70 that is recirculated through the HVAC system 80 can have a relatively low humidity due to adsorption of moisture from the air during a previous adsorption cycle, and may limit the impact of the airflow 152 on the load of the HVAC system 80.

The desiccant 150 is regenerated by heating the desiccant 150 with the heating source to desorb moisture from the desiccant 150. With the airflow 152 directed through the bypass 163 during the regeneration process, the purge airflow 162 is directed through the sorption system 125 and accumulates moisture from the desiccant 150. The warm, moist purge airflow 162 is then discharged or vented to the atmosphere. In embodiments that include the cooling source, the desiccant 150 is cooled via heat transfer with the cooling source after the desiccant 150 has been substantially desorbed so that the desiccant 150 can thereafter continue to adsorb moisture from the airflow 152 entering the sorption system 125. Generally, cooling the desiccant 150 after heating the desiccant 150 and prior to continuing the dehumidification process improves or increases the adsorption capacity of the desiccant 150.

In embodiments of the sorption system 125 that include the first portion and the second portion, the airflow 152 can be directed through the first portion to dehumidify the airflow 152 by adsorption using the desiccant 150. Contemporaneously or concurrently, moisture that has been previously adsorbed by the desiccant 150 in the second portion is desorbed by heating the second portion using the heat source and the purge airflow 162. In this manner, the sorption system 125 can continuously dehumidify the airflow 152 to reduce the load on the cooling system 130 and the heating system 135. Concurrent operation of the sorption system 125 in this manner allows substantially continuous dehumidification of the airflow 152 by switching between the first portion and the second portion.

The dehumidified airflow 153 is discharged from the outlet 145 of the sorption system 125 and is directed toward the evaporator assembly 180. The cooling system 130 conditions the airflow 153 by heat transfer with the cooling coil 195. The conditioned airflow 154 is then directed from the evaporator assembly 180 into the space 90 via the fan 200. During operation of the cooling system 130, refrigerant is circulated through the refrigerant circuit 165 to cool the dehumidified airflow 153 via heat transfer with the cooling coil 195. Relatively warm refrigerant is compressed by the compressor assembly 170, and the compressed refrigerant is then cooled within the condenser 175 by heat transfer with air that is adjacent and in communication with the condenser 170. The cooled refrigerant is directed to the evaporator assembly 180 and through the cooling coil 195. The previously cooled refrigerant is heated by heat transfer with the dehumidified airflow 153. The fan 200 directs the cooled, dehumidified airflow 154 into the cabin 70 to condition the space 90.

During operation of the heating system 135, the space 90 is conditioned using the non-dehumidified airflow 152 from the bypass 163. Generally, the airflow 152 bypasses the sorption system 125 during operation of the heating system 135 and is conditioned by the heating coil 215. In some constructions, some or all of the airflow 152 can be dehumidified by the sorption system 125, and the dehumidified airflow 153 can then be conditioned by the heating coil 215. Coolant is circulated through the coolant circuit 45 to heat the non-dehumidified airflow 152 via heat transfer with the heating coil 215. The heated airflow 154 is then discharged by the fan 200 into the cabin 70 to condition the space 90. When the prime mover 30 is in the first mode, heat from the prime mover 30 heats the coolant in the coolant circuit 45, which in turn can selectively provide heat to the space 90. When the prime mover 30 is in the second mode, the heater 205 can be selectively engaged to heat the coolant in the coolant circuit 45 to provide heat to the space 90. In addition, the coolant heated by the heater 205 can keep the prime mover 30 relatively warm as needed when the prime mover 30 is in the "Off" state.

The controller 225 receives the signals indicative of the parameters of the prime mover 30, the coolant system 40, battery pack 115, and the HVAC system 80 from the respective sensors 220. The controller 225 monitors and controls these sub-systems based on the signals received from the sensors 220. For example, when the sensor 220 that is in communication with the battery pack 115 senses that the charge of the battery pack 115 is below a predetermined value when the prime mover 30 is in the second mode, the controller 225 will engage the prime mover 30 to charge the battery pack 115 via the alternator 25 if no external power source is available. In circumstances where an external power source is available, such as the electric stand 117, the controller 225 will provide power to the sub-systems via the external power source. In addition, when the controller 225 receives a signal that is indicative of the desiccant 150 being saturated from the sensor 220 that is in communication with the sorption system 125, the controller 225 initiates the regeneration process to desorb the desiccant 150.

The controller 225 also receives signals from the sensors 220 that are coupled to the heater 205, and controls operation of the heater 205 based on the received signals. For example, when the space 90 is to be heated by the heating system 135, the controller 225 determines whether the prime mover 30 is in the first mode using the signal from the sensor 220 that is in communication with the prime mover 30. When the prime mover 30 is in the second mode, the controller 225 engages the heater 205 to heat the coolant in the coolant circuit 45. Generally, the controller 225 controls various operations of the vehicle 10 and the sub-systems of the vehicle 10 to efficiently condition the cabin 70 and to provide adequate power to the various components of the vehicle 10 when the prime mover 30 is in the first mode and when the prime mover 30 is in the second mode. Thus, the controller can automatically control various aspects of the sub-systems of the vehicle 10.

The insulated cabin 70 and the sorption system 125 reduce the conditioning load that is necessary to effectively condition the space 90 by dehumidifying the airflow 152 prior to conditioning the airflow 152, and by effectively insulating the conditioned space 90. Reducing the conditioning load reduces the power needed by the cooling system 130 and the heating system 135 to condition the space 90. As a result, the power supplied by the battery pack 115 will last a relatively long time when the prime mover 30 is in the second mode because a smaller amount of power is needed to effectively condition the space 90 relative to the power necessary to condition non-dehumidified air.

Various features and advantages of the invention are set forth in the following claims.

What is claimed is:
1. A vehicle comprising:
a frame;
a prime mover coupled to the frame, the prime mover operable in a first mode configured for driving the vehicle and a second mode configured for standby operation of the vehicle;
an alternator coupled to the prime mover;

a cabin supported on the frame, the cabin including walls defining a space and having insulation configured to insulate the space;

a heating, ventilation, and air conditioning ("HVAC") system coupled to the frame and in communication with the cabin to condition the space with an airflow, the HVAC system including a cooling system configured to cool the space, a heating system configured to heat the space, and a sorption system configured to dehumidify the airflow provided to the space;

a power source including a battery in electrical communication with the alternator, the battery further in electrical communication with the HVAC system to supply power to the HVAC system from the battery when the prime mover is in the first mode and when the prime mover is in the second mode.

2. The vehicle of claim 1, wherein the first mode corresponds to the prime mover in an "on" state, and wherein the second mode corresponds to the prime mover in an "off" state.

3. The vehicle of claim 1, wherein the insulation includes at least one vacuum insulation panel.

4. The vehicle of claim 1, wherein the insulation includes an aerogel.

5. The vehicle of claim 1, wherein the battery is configured to be charged by the alternator when the vehicle is in the first mode.

6. The vehicle of claim 1, further comprising at least one accessory, wherein the battery is in electrical communication with the accessory to supply power to the accessory when the prime mover is in the first mode and when the prime mover is in the second mode.

7. The vehicle of claim 1, wherein the power source includes a plurality of batteries.

8. The vehicle of claim 1, wherein the sorption system includes an inlet, an outlet, and a desiccant disposed between the inlet and the outlet, and wherein the sorption system is configured to receive the airflow via the inlet such that the airflow is configured to be dehumidified prior to discharge of the airflow through the outlet.

9. The vehicle of claim 8, wherein the cooling system includes an evaporator assembly, and wherein the evaporator assembly is in communication with the sorption system to receive the substantially dehumidified airflow from the sorption system.

10. The vehicle of claim 8, wherein the sorption system includes a first portion configured to adsorb moisture from the airflow received via the inlet, and a second portion configured to desorb moisture from the desiccant.

11. The vehicle of claim 1, further comprising a coolant circuit in communication with the prime mover, wherein the coolant circuit is further in communication with the heating system such that heat from the heating system is configured to warm the coolant circuit when the prime mover is in the second mode.

* * * * *